United States Patent [19]

Frey et al.

[11] 4,267,115
[45] May 12, 1981

[54] ANTHRAQUINONE COMPOUNDS

[75] Inventors: Wolfgang Frey, Münchenstein; Wolfgang Schoenauer, Riehen, both of Switzerland

[73] Assignee: Sandoz Ltd., Basel, Switzerland

[21] Appl. No.: 931,753

[22] Filed: Aug. 7, 1978

Related U.S. Application Data

[62] Division of Ser. No. 529,293, Dec. 4, 1974, abandoned, which is a division of Ser. No. 199,811, Nov. 17, 1971, Pat. No. 3,872,137, which is a division of Ser. No. 808,322, Mar. 18, 1969, Pat. No. 3,646,071.

[30] Foreign Application Priority Data

Apr. 8, 1968 [CH] Switzerland .................. 5122/68
May 3, 1968 [CH] Switzerland .................. 8169/68
Sep. 30, 1968 [CH] Switzerland .................. 14593/68

[51] Int. Cl.$^3$ ............................ C07C 143/665
[52] U.S. Cl. .................................... 260/373
[58] Field of Search ............... 260/371, 372, 373, 374, 260/378, 380

[56] References Cited

U.S. PATENT DOCUMENTS

| | | | |
|---|---|---|---|
| 2,113,054 | 4/1938 | Lodge | 260/373 |
| 2,117,569 | 6/1936 | Peter | 260/373 |
| 2,453,285 | 11/1948 | Allmen et al. | 260/371 |
| 2,580,190 | 12/1951 | Peter et al. | 260/373 |
| 2,616,900 | 11/1952 | Allmen et al. | 260/371 |
| 2,992,240 | 7/1961 | Lodge | 260/373 X |
| 3,646,071 | 2/1972 | Frey et al. | 260/371 |
| 3,872,137 | 3/1975 | Frey et al. | 260/374 |

FOREIGN PATENT DOCUMENTS

| | | | |
|---|---|---|---|
| 508200 | 12/1954 | Canada | 260/374 |
| 541637 | 12/1931 | Fed. Rep. of Germany . | |
| 1150966 | 1/1958 | France | 260/373 |
| 251287 | 9/1948 | Switzerland | 260/371 |
| 251288 | 9/1948 | Switzerland | 260/371 |
| 251289 | 9/1948 | Switzerland | 260/371 |
| 255968 | 2/1949 | Switzerland . | |
| 255969 | 2/1949 | Switzerland | 260/371 |
| 461998 | 3/1937 | United Kingdom | 260/371 |
| 918968 | 2/1963 | United Kingdom | 260/374 |

*Primary Examiner*—Winston A. Douglas
*Assistant Examiner*—Raymond K. Covington
*Attorney, Agent, or Firm*—Gerald D. Sharkin; Richard E. Vila; Thomas C. Doyle

[57] ABSTRACT

Water-soluble anthraquinone dyes which bear one or two 3,5,5-trimethylcyclohexylamino groups in the 1- and/or 4-positions and one or two -SO$_3$H groups bound either directly to a carbon atom of an aromatic ring or indirectly over an oxygen atom to a carbon atom of an aliphatic chain.

3 Claims, No Drawings

ANTHRAQUINONE COMPOUNDS

This is a division of application Ser. No. 529,293, filed Dec. 4, 1974 now abandoned, which in turn is a division of application Ser. No. 199,811, filed Nov. 17, 1971, now U.S. Pat. No. 3,872,137, which in turn is a division of Ser. No. 808,322, filed March 18, 1969, now U.S. Pat. No. 3,646,071.

This invention relates to new anthraquinone compounds, the processes of their production and their uses. These anthraquinone compounds are of formula

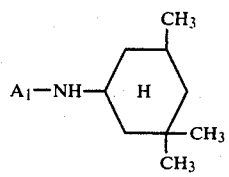  (I), where $A_1$ represents one of the radicals

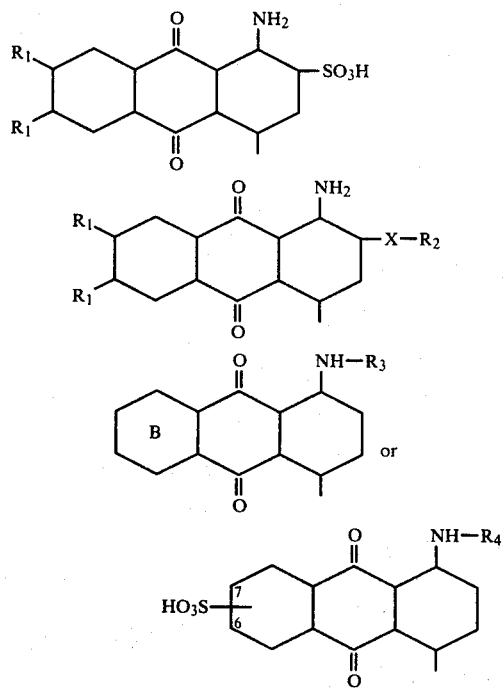

In formulae (II) to (V) one $R_1$ stands for a hydrogen, fluorine, chlorine or bromine atom or a —$SO_3H$-group and the other $R_1$ for a hydrogen atom, or $R_1$ in each instance stands for a chlorine atom, $R_2$ for 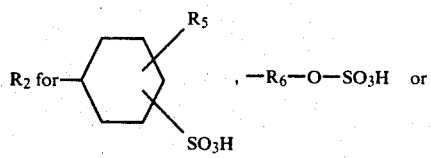, —$R_6$—O—$SO_3H$ or

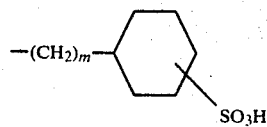

$R_3$ for alkylene—CO—N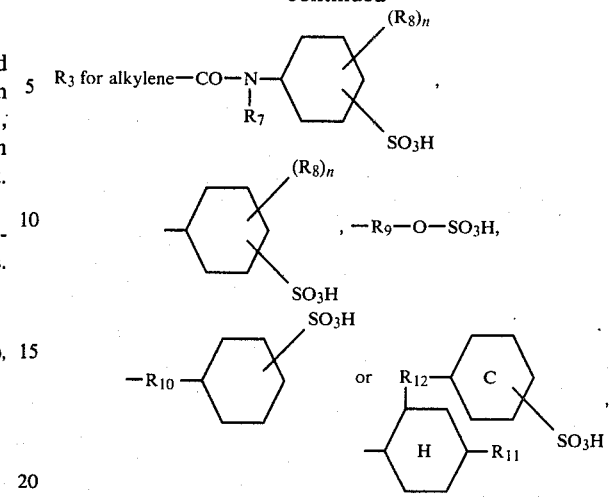

$R_4$ for secondary alkyl having 3 to 6 carbon atoms, cyclohexyl, 3,5,5-trimethylcyclohexyl, or

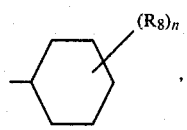

R hd 5 for hydrogen, alkyl or alkoxy having 1 to 9 carbon atoms or halogen, $R_6$ for —$CH_2$—$CH_2$—, —$CH_2$—$CH_2$—$CH_2$—, —$CH_2$—$CH$—,
$\qquad\qquad\qquad\qquad\qquad\qquad\qquad\qquad\qquad\quad\ |$
$\qquad\qquad\qquad\qquad\qquad\qquad\qquad\qquad\qquad\ CH_3$ —$CH$—$CH_2$—, —$CH_2$—$CH$—$CH_2$—
$\ |\qquad\qquad\qquad\qquad\ |$
$CH_3\qquad\qquad\qquad\quad OH$ or—$CH_2$—$CH_2$—(O—$CH_2$—$CH_2$)$_p$—, $R_7$ for hydrogen or lower alkyl, $R_8$ for hydrogen, lower alkyl or alkoxy, halogen or lower acylamino, $R_9$ for —$CH_2$—$CH_2$—, —$CH_2$—$CH_2$—$CH_2$—, —$CH_2$—$CH$—,
$\qquad\qquad\qquad\qquad\qquad\qquad\qquad\qquad\qquad\qquad\ |$
$\qquad\qquad\qquad\qquad\qquad\qquad\qquad\qquad\qquad\ CH_3$ —$CH_2$—$CH$—$CH_2$—, —$CH$—$CH_2$— or —$CH$—$(CH_2)_r$—,
$\qquad\ \ |\qquad\qquad\qquad\ |\qquad\qquad\qquad\qquad\ |$
$\qquad OH\qquad\qquad\quad C_2H_5\qquad\qquad\qquad\ CH_3$

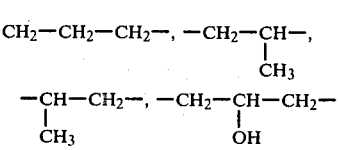

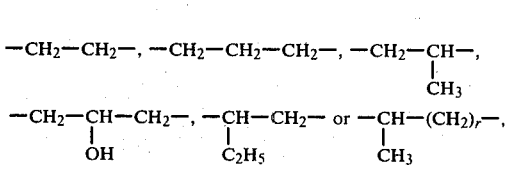

$R_{11}$ for hydrogen or alkyl having 1 to 8 carbon atoms, $R_{12}$ for—$CH_2$—, —$CH_2$—$CH_2$— or

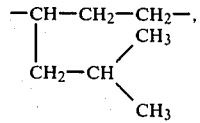,

X for—O—or—S—, alkylene for

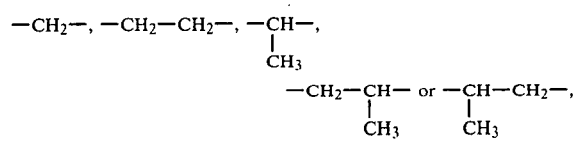

m for 1 or 2,
n for 1 to 3,
p for 1 to 9 and
r for 1 to 6.

The SO₃H group in formula (V) may be in the 6- or 7-position; the nucleus B may bear a chlorine atom or an SO₃H group in the 6- or 7-position or two hydroxyl or amino groups or one hydroxyl and one amino group in the 5- and 8-positions, respectively; the nucleus C may bear 1 to 3 lower alkyl or alkoxy groups; if n stands for 2 or 3, every substituent $R_8$ may have a separate significance.

The preferred compounds are those of formulae

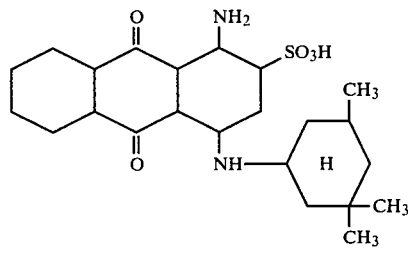 (VI)

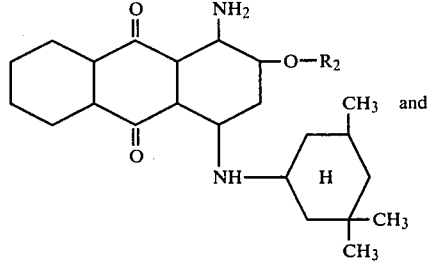 (VII)

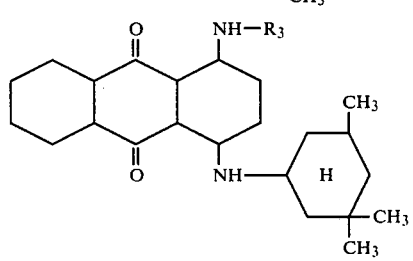 (VIII)

Particularly valuable compounds of formulae (VII) and (VIII) are those in which

—O—$R_2$ stands for the radical of a sulphonated phenol which may bear an alkyl group in the para-position or for a sulphated 2-hydroxyethyl, 2-hydroxypropyl, 3-hydroxypropyl or 2,3-dihydroxypropyl radical, $R_3$ for a sulphonated benzene radical which may bear 1 to 3 lower alkyl groups, a lower alkoxy or acylamino group, or for a sulphonated benzyl or phenylalkyl radical, the radical in which is connected to the amino group through a secondary carbon atom, or for a radical of formula

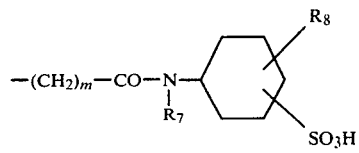

where
m stands for 1 or 2,
$R_7$ for hydrogen, methyl or ethyl and $R_8$ for hydrogen, methyl, ethyl, chlorine, methoxy, ethoxy or acetylamino.

The new compounds are produced by reacting 1 mole of 3,5,5-trimethylcyclohexylamine with 1 mole of an anthraquinone compound of formula

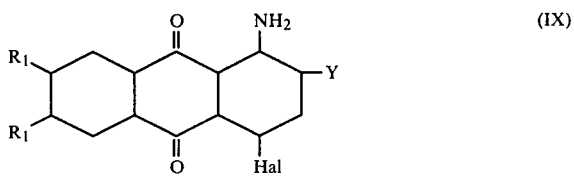 (IX)

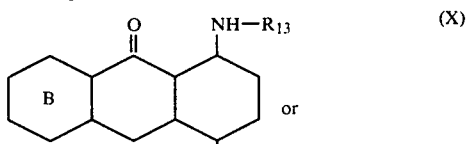 (X)

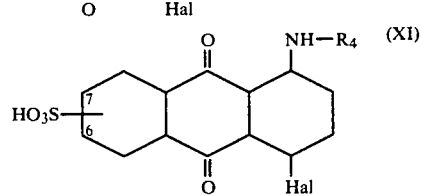 (XI)

where
Hal stands for chlorine, bromine or fluorine,
Y for bromine or —SO₃H,

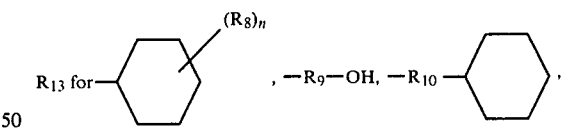

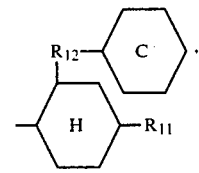

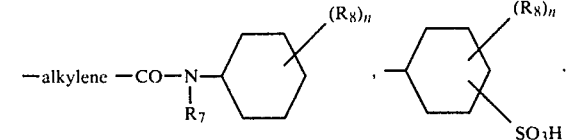

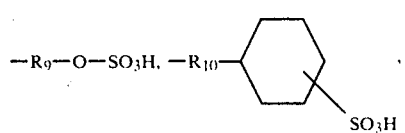

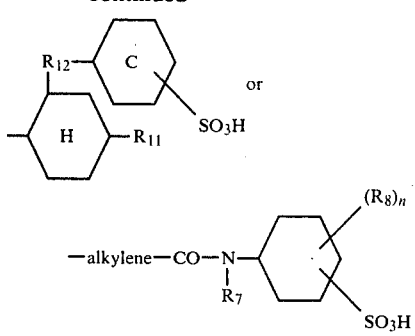

If Y represents bromine, the reaction product is treated with a water soluble neutral sulphite, or if $R_{13}$ bears no —$SO_3H$ group, with sulphur trioxide or an agent yielding sulphur trioxide.

A process for the production of anthraquinone compounds of formula

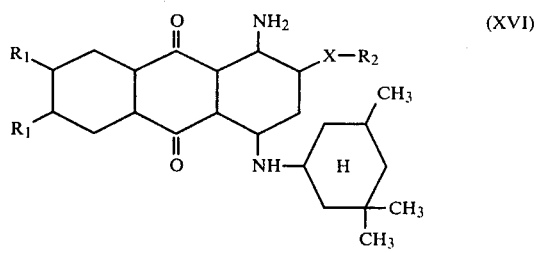

consists in reacting 1 mole of an anthraquinone compound of formula (IX) with 1 mole of 3,5,5-trimethylcyclohexylamine and reacting the product with 1 mole of a compound of formula

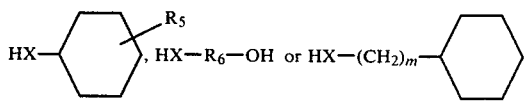

and treating with sulphur trioxide or an agent yielding sulphur trioxide.

Examples of suitable compounds of formula (IX) are 1-amino-2,4-dibromoanthraquinone, 1-amino-4-bromo-, 1-amino-4,6- and -4,7-dibromo, 1-amino-4-bromo-6-chloro- and -7-chloro-, 1-amino -4-bromo-6- and -7-fluoro-, 1-amino-4-bromo-6,7-dichloroanthraquinone-2-sulphonic acid, 1-amino-4-bromoanthraquinone-2,6- and -2,7-disulphonic acid.

The reaction of the 3,5,5-trimethylcyclohexylamine with the compounds of formulae (IX), (X) or (XI) can be effected at temperatures ranging from 40° to 220° C. The water soluble anthraquinone compounds are best reacted in an aqueous or aqueous-organic medium, e.g. at temperatures of 45° to 100° C. or preferably 45° to 85° C. for the compounds of formula (IX) in which Y stands for $SO_3H$ while the water insoluble anthraquinone compounds are best reacted in organic medium, e.g. at 80° to 200° C. or preferably 100° to 150° C., more particularly 110°–130° C., for the compounds of formula (IX) where Y stands for a bromine atom. Mixtures of water and one or more solvents which are at least partially water soluble and are indifferent to the reactants are employed as aqueous-organic media, e.g. lower alcohols (methanol, ethanol, isopropanol, butanol, ethylene glycol), ethers (dioxan, 1,2-dimethoxy- or 1,2-diethoxyethane), ether alcohols (2-methoxy- or 2-ethoxyethanol, 2-(2'-methoxyethoxy)- or 2-2(2'-ethoxyethoxy)-ethanol), ketones (methylethyl ketone), AMIDES (dimethylformamide, dimethylacetamide), sulphoxides and sulphones (dimethylsulphoxide, sulpholan-tetramethylenesulphone). These solvents are used in amounts of up to 25% or preferably 5% to 15% on the total weight of the mixture.

It is of advantage to react in the presence of acid-binding agents which impart to the reaction medium a pH of at least 11 (the pH value of a saturated aqueous solution of 3,5,5-trimethylcyclohexylamine) and of a catalyst; for this purpose preference is given to alkali metal hydroxides (sodium or potassium hydroxide) and to copper catalysts (copper powder, copper-I-oxide, copper-I-chloride, copper-II-oxide). To accelerate the reaction it is desirable to employ an excess of 3,5,5-trimethylcyclohexylamine, e.g. 1.3 to 3 moles or preferably 1.5 to 2 moles, permole of the halogenanthraquinone compound.

For the reaction in organic medium the 3,5,5-trimethylcyclohexylamine itself is employed as solvent or a solvent is used which is indifferent to the 3,5,5-trimethylcyclohexylamine and of high boiling point, e.b. 130° to 220° C., for example mono- or di-chlorobenzene, dimethylformamide, dimethylacetamide, dimethylsulphoxide, glycol ethers and in particular nitrobenzene. Examples of suitable acid binding agents are an excess of the amine, a tertiary amine of low volatility and of higher basicity than 3,5,5-trimethylcyclohexylamine, a basic metal salt such as sodium or potassium carbonate, or an alkali metal hydroxide. If necessary the aforenamed copper catalysts are employed.

The final products are isolated in the normal way, e.g. by evaporation, preferably at reduced pressure, water vapour distillation, or dilution with a suitable agent, e.g. with water when water soluble solvents are used, or with a lower alcohol such as methanol, ethanol or isopropanol or a hydrocarbon such as petroleum ether or ligroin. On isolation they are filtered with suction, washed if necessary and dried.

After condensation of the 3,5,5-trimethylcyclohexylamine with a compound of formula (IX) in which Y stands for a bromine atom the reaction product is reacted with a neutral, water soluble sulphite in aqueous-organic, e.g. aqueous-alcoholic or aqueous-phenolic (phenol itself, a cresol or cresol mixture) medium, in which the concentrated sulphite solution forms the aqueous phase, at 100° to 150° C., preferably 120°–130° C., under pressure.

The reaction product of formula

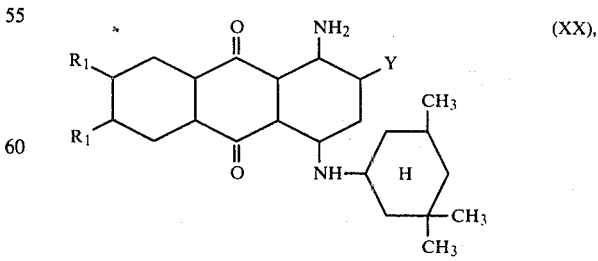

prepared from 3,5,5-trimethylcyclohexylamine and a compound of formula (IX), is reacted with hydroxy or thiol compounds of formulae

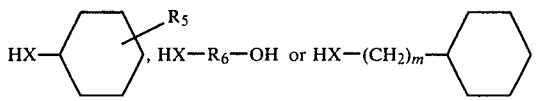

at temperatures of e.g. 50= to 200° C., preferably at 50° to 150° C. or optimally at 60° to 120° C. in the case of the thiol compounds, and 100° to 200° C. or more particularly 110° to 180° C. in the case of the hydroxyl compounds, and in the presence of acid-binding agents such as alkali metal carbonates or hydroxides. It is advantageous to react in an inert solvent, e.g. an alcohol such as ethanol, butanol, cyclohexanol, an ether alcohol such as 2-methoxy-, 2-ethoxy- or 2-butoxyethanol, 2-(2'-methoxy-, 2-ethoxy- or 2-(2'-butoxy-ethoxy)-ethanol, an ether such as dioxane, or in a hydrocarbon such as cyclohexane, toluene or chlorobenzene, or if the compounds of formula (IX) bear a sulphonic acid group in water in the case of thiol compounds. An excess of the thiol compound may be employed as solvent. Suitable solvents for the reaction with hydroxy compounds include pyridine, a mixture of pyridine bases, quinoline, nitrobenzene, 2,6-di-tert. butyl-4-methylphenol, or a excess of the hydroxy compound itself. Any water present or formed prior to or during the reaction is eliminated. For the reaction of the bromine atom in the 2-position it may be of advantage to add a copper catalyst, e.g. copper-I-chloride, especially in the case of thiol compounds. The reaction products are precipitated in the known way, e.g. by dilution with a lower alcohol or, if water-soluble or alkali-soluble hydroxyl or thiol compounds have been employed, with water or with alkali hydroxide solutions, and then filtered off with suction, washed and dried.

The treatment with sulphur trioxide (in gaseous form diluted with air or as an adduct on pyridine or dioxane, or with chlorosulphonic acid can be carried out in an inert solvent such as chloroform, 1,2-dichlorethane or nitrobenzene at temperatures of 0° to 50° C. or preferably at 15 30° C. Normally however concentrated sulphuric acid of about 96–100% strength is employed, or oleum with an $SO_3$ content of up to about 15% for reaction at the aforestated temperatures. Under these conditions the benzene nuclei are sulphonated and the aliphatic hydroxyl groups sulphated. For sulphation concentrated sulphuric acid can be employed at 10°–20° C., whilst for sulphonation at the same temperature it is advisable to employ oleum with an $SO_3$ content of 5–10%. For converting the hydroxyalkyl groups into sulphatoalkyl groups aminosulphonic acid can also be employed with advantage, e.g. at 100°–150° C. The sulphonated or sulphated compound can be isolated by running the solutions into water or into a salt solution, with further addition of salt if necessary.

The final compounds are water-soluble dyes containing at least one —$SO_3H$ group and are employed for the exhaustion dyeing, pad dyeing and printing of wool, silk, hair fibres, polyamide and polyurethane fibres and leather. The dyeings and prints obtained on these materials are of brilliant shade and have good to very good wet fastness properties (washing, milling, perspiration, water, sea water), with good rubbing and dry cleaning fastness. On polyamide fibres the light fastness is very good and better than on wool.

In the Examples the parts and percentages are by weight and the temperatures in degrees centigrade.

EXAMPLE 1

A mixture of 400 parts of water, 40.4 parts of sodium 1-amino-4-bromanthraquinone-2-sulphonate, 20 parts of 1-amino-3,5,5trimethylcyclohexane, 15 parts of 30% sodium hydroxide solution, 50 parts of ethanol and 1 part of copper powder is stirred for 5 hous at 65°. The blue dye formed is isolated and dried in the normal way. It is of formula (VI). From aqueous solution it gives dyeings of brilliant reddish blue shade on polyamide fibres which have very good wet fastness properties and outstandingly good light fastness.

This new dye has far better wet fastness properties on synthetic polyamide fibres than the known commercial dye which bears an unsubstituted cyclohexylamino group in the 4-position.

The same dye can be obtained by the following alternative route. A mixture of 38.1 parts of 1-amino-2,4-dibromanthraquinone, 160 parts of 3,5,5-trimethylcyclohexylamine, 25 parts of anhydrous potassium acetate and 0.5 part of copper-I-chloride is maintained at 110°–120° until the starting material has disappeared. The mixture is then diluted with methanol and allowed to cool to room temperature. The precipitate is filtered off, washed successively with methanol and water and dried. It may be recrystallized if desired, after which 10 parts are mixed with 50 parts of phenol and 20 parts of 50% potassium sulphite solution in an autoclave and reacted at 130° for 16 hours. The phenol is distilled off with water vapour and the dye salted out, filtered off with suction and washed with salt solution. If necessary it is then dissolved in hot water, filtered while hot to free it from water insoluble impurities and salted out, on which it is dried.

DYEING EXAMPLE

A solution of 2 parts of the dye of Example 1 in 6000 parts of water at 40° is prepared and to it is added 4 parts of ammonium sulphate. 100 parts of a nylon 66 yarn are entered into the dyebath, which is then brought to the boil in 30 minutes and held at this temperature for 1 hour. Subsequently the yarn is rinsed and dried. It is dyed in a fast, brilliant reddish blue shade.

EXAMPLE 2

At 100°–110° 7.5 parts of potassium hydroxide are dissolved in 100 parts of phenol, after which 18 parts of sodium 1-amino-4-(3',5',5'-trimethylcyclohexylamino)-anthraquinone-2-sulphonate are added. The temperature is increased to 170° and this temperature maintained until a sample is insoluble in water. The mixture is then allowed to cool to 100° 150 parts of methanol are added and it is allowed to cool further to 20°. The dye base is filtered off with suction, washed with methanol and then with water and dried. 10 parts of the dye base are entered into 45 parts of 5–10% oleum and stirred at 15°–25° until fully water soluble. The sulphonated dye is worked up in the normal way. On wool and synthetic polyamide fibres it gives dyeings of brilliant violet shade having good light and wet fastness.

It has the formula

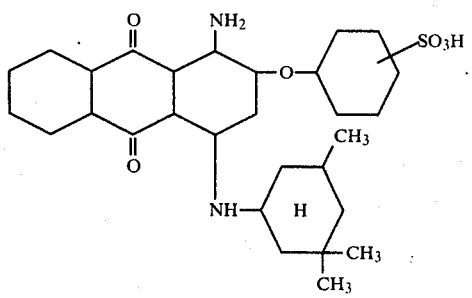

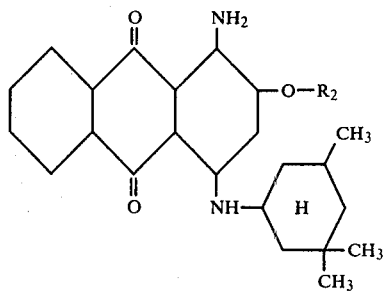

The same dye can be obtained by reacting 16 parts of 1-amino-2-bromo-4-(3',5',5'-trimethylcyclohexylamino)-anthraquinone in a mixture of 16 parts of phenol, 50 parts of nitrobenzene and 7.5 parts of potassium hydroxide at 150° until the starting products have disappeared, and continuing as stated in the foregoing.

The following Table 1 specifies further dyes of formula

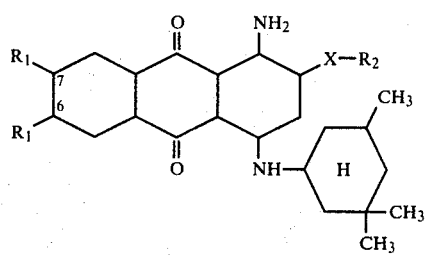

(XXIX), by stating the meanings of $R_{1\,(6)}$, $R_{1\,(7)}$, X and $R_2$. These dyes give dyeings of violet shade on wool and synthetic polyamide fibres (when X stands for —O—) or of greenish blue shade (when X stands for —S—).

| Example No. | $R_{1(6)}$ | $R_{1(7)}$ | X | $R_2$ |
|---|---|---|---|---|
| 3 | H | H | —O— | sulpho-4-methylphenyl |
| 4 | H | H | —S— | sulphophenyl |
| 5 | H | H | —O— | sulpho-2-methylphenyl |
| 6 | H | H | —O— | sulpho-4-methoxyphenyl |
| 7 | H | H | —O— | sulpho-4-ethoxyphenyl |
| 8 | H | H | —O— | sulpho-4-n-butoxyphenyl |
| 9 | Cl | H | —O— | sulphophenyl |
| 10 | H | Cl | —O— | " |
| 11 | F | H | —O— | " |
| 12 | Br | H | —O— | " |
| 13 | Cl | Cl | —O— | " |
| 14 | H | H | —O— | sulpho-4-isopropylphenyl |
| 15 | SO₃H | H | —O— | sulpho-4-tert.butylphenyl |
| 16 | SO₃H | H | —O— | sulpho-4-tert.amylphenyl |
| 17 | SO₃H | H | —O— | sulpho-4-tert.octylphenyl |
| 18 | SO₃H | H | —O— | sulpho-4-tert.nonylphenyl |
| 19 | H | H | —O— | sulpho-4-tert.butylphenyl |
| 20 | H | SO₃H | —O— | sulpho-4-tert.butylphenyl |
| 21 | H | H | —O— | sulpho-4-chlorophenyl |
| 22 | H | H | —O— | sulpho-4-fluorophenyl |
| 23 | H | H | —O— | sulpho-4-bromophenyl |
| 24 | H | H | —O— | sulphobenzyl |
| 25 | H | H | —S— | " |
| 26 | H | H | —O— | 2-(sulphophenyl)-ethyl |

Having thus disclosed the invention what we claim is:
1. A dye of the formula

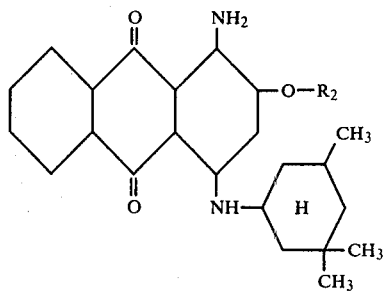 (VII)

wherein $R_2$ is

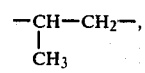 or

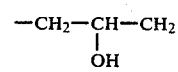

$R_5$ is hydrogen, alkyl or alkoxy with 1 to 9 carbon atoms or halogen,
—CH₂—CH₂—CH₂—, $$-\underset{\underset{CH_3}{|}}{CH}-CH_2-,$$

or $$-CH_2-\underset{\underset{OH}{|}}{CH}-CH_2$$

—(O—CH₂—CH₂)ₚ—
and m is 1 or 2.

2. A compound of claim 1 of the formula

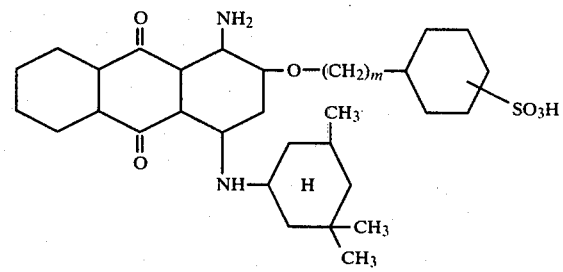

wherein m is 1 or 2.

3. A compound according to claim 2 of the formula

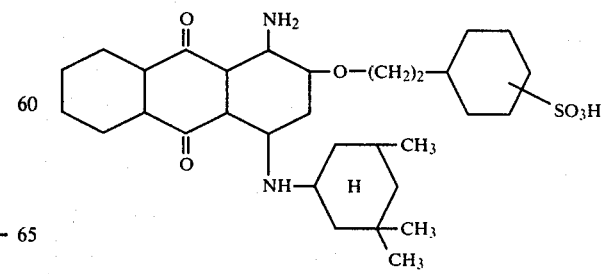

* * * * *